United States Patent
Sutherland

(10) Patent No.: US 7,724,992 B2
(45) Date of Patent: May 25, 2010

(54) GLASS-BASED MICROPOSITIONING SYSTEMS AND METHODS

(75) Inventor: James Scott Sutherland, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 11/978,411

(22) Filed: Oct. 29, 2007

(65) Prior Publication Data

US 2009/0110354 A1 Apr. 30, 2009

(51) Int. Cl.
G02B 6/26 (2006.01)

(52) U.S. Cl. .................. 385/15; 385/88; 385/91; 438/31

(58) Field of Classification Search .......... 385/52, 385/88–91, 14, 15, 50; 257/98, E33.067; 438/31

See application file for complete search history.

(56) References Cited

U.S. PATENT DOCUMENTS

| | | | |
|---|---|---|---|
| 5,249,245 A | 9/1993 | Lebby et al. ............. 385/89 |
| 5,371,820 A | 12/1994 | Welbourn et al. ......... 385/76 |
| 5,613,024 A | 3/1997 | Shahid ................... 385/52 |
| 6,012,855 A | 1/2000 | Hahn ..................... 385/89 |
| 6,096,445 A * | 8/2000 | Terakado et al. ........ 428/848.3 |
| 6,118,917 A | 9/2000 | Lee et al. ................ 385/49 |
| 6,333,522 B1 * | 12/2001 | Inoue et al. .............. 257/99 |
| 6,343,171 B1 | 1/2002 | Yoshimura et al. ....... 385/50 |
| 6,352,374 B1 | 3/2002 | Selfridge et al. ......... 385/76 |
| 6,618,514 B1 | 9/2003 | Cole ..................... 385/14 |
| 6,700,639 B2 * | 3/2004 | Tatemura et al. ......... 349/200 |
| 6,771,453 B2 * | 8/2004 | Baumgartner et al. ..... 360/75 |
| 6,821,029 B1 | 11/2004 | Grung et al. ............. 385/92 |
| 6,865,324 B1 | 3/2005 | Jeantilus et al. .......... 385/115 |
| 7,239,767 B2 * | 7/2007 | Kim et al. ............... 385/14 |
| 2002/0104959 A1 | 8/2002 | Arsenault et al. ....... 250/227.11 |
| 2002/0109000 A1 | 8/2002 | Rinne .................... 228/102 |
| 2002/0110328 A1 | 8/2002 | Bischel et al. ............ 385/49 |
| 2002/0126962 A1 | 9/2002 | Kadar-Kallen et al. .... 385/88 |
| 2002/0181854 A1 | 12/2002 | Steinberg et al. ......... 385/20 |
| 2002/0196998 A1 | 12/2002 | Steinberg et al. ......... 385/14 |
| 2003/0002770 A1 | 1/2003 | Chakravorty et al. ..... 385/14 |
| 2003/0031428 A1 | 2/2003 | Wickman et al. ......... 385/89 |
| 2003/0034438 A1 | 2/2003 | Sherrer et al. ........... 250/216 |
| 2003/0014922 A1 | 7/2003 | Dallas et al. ............. 385/83 |
| 2004/0105628 A1 | 6/2004 | Morse et al. ............. 385/89 |
| 2004/0120658 A1 | 6/2004 | McFarland et al. ....... 385/89 |
| 2004/0126050 A1 | 7/2004 | Claydon et al. .......... 385/14 |

(Continued)

FOREIGN PATENT DOCUMENTS

EP    0652554 A1    11/1994

(Continued)

*Primary Examiner*—Ellen Kim
(74) *Attorney, Agent, or Firm*—Michael W. Russell; Gregory V. Bean

(57) ABSTRACT

A method of forming a microbump for micropositioning an optical element comprises providing a base substrate, providing a first optical element to be supported by the base substrate, and providing an alignment element capable of locally expanding when locally heated and adapted to support the first optical element from the base substrate. The method further comprises locally heating the alignment element to cause local expansion of the alignment element so as to create a microbump alignment element, terminating heating of the alignment element so as to fix the microbump and securing the alignment element to the base substrate, thereby supporting the first optical element from the base substrate.

10 Claims, 3 Drawing Sheets

U.S. PATENT DOCUMENTS

| | | |
|---|---|---|
| 2004/0240099 A1* | 12/2004 | Brannon et al. ............... 360/75 |
| 2004/0265646 A1* | 12/2004 | Kavosh et al. ......... 428/694 TC |
| 2005/0117848 A1 | 6/2005 | Amleshi et al. ............... 385/49 |
| 2006/0023990 A1 | 2/2006 | Shih et al. .................... 385/14 |
| 2006/0034015 A1* | 2/2006 | Yamamoto et al. .......... 360/135 |
| 2006/0067624 A1 | 3/2006 | Towle et al. ................. 385/49 |
| 2006/0291369 A1* | 12/2006 | Yoon et al. .................. 369/288 |
| 2007/0201797 A1* | 8/2007 | Grzybowski et al. .......... 385/52 |

FOREIGN PATENT DOCUMENTS

| | | |
|---|---|---|
| EP | 0628175 | 4/1998 |
| EP | 1524060 A2 | 4/2005 |
| JP | 2005-292379 | 10/2005 |
| WO | WO99/50700 | 10/1999 |
| WO | WO02/086552 | 10/2002 |

* cited by examiner

GLASS-BASED MICROPOSITIONING SYSTEMS AND METHODS

BACKGROUND OF THE INVENTION

Field of the Invention

The present invention relates generally to optical element micropositioning systems and methods, and in particular to the alignment of fine-pitch arrays of waveguides to optical chip waveguide arrays.

SUMMARY OF THE INVENTION

A first aspect of the present invention is a method of forming a microbump for micropositioning an optical element. The method comprises providing a base substrate, providing a first optical element to be supported by the base substrate, and providing an alignment element capable of locally expanding when locally heated and adapted to support the first optical element from the base substrate. The method further comprises locally heating the alignment element to cause local expansion of the alignment element so as to create a microbump alignment element, terminating heating of the alignment element so as to fix the microbump, and securing the alignment element to the base substrate, thereby supporting the first optical element from the base substrate.

Another aspect of the invention is an optical assembly that comprises a first optical element, at least a select one of base a substrate and a second optical element, and an alignment element supporting the first optical element and having at least one microbump formed thereon by expansion of the alignment element due to local heating of the alignment element in a corresponding at least one location, wherein the first optical element is micropositioned by the at least one microbump from the at least select one of the base substrate and the second optical element.

The present inventive method for forming a microbump for micropositioning an optical element and the resultant optical assembly are compatible with existing surface mount technology processes for mounting electronic components, allow implementation of high-density interconnection technology, are relatively low cost, and provide long term reliability. Further, the present advantages may be implemented in a wide variety of component types and configurations, provide flexibility in the associated manufacturing process, allow standardization of optical interconnection technology and are particularly well adapted for the proposed use.

Additional aspects, features and advantages of the invention are set forth in the detailed description that follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
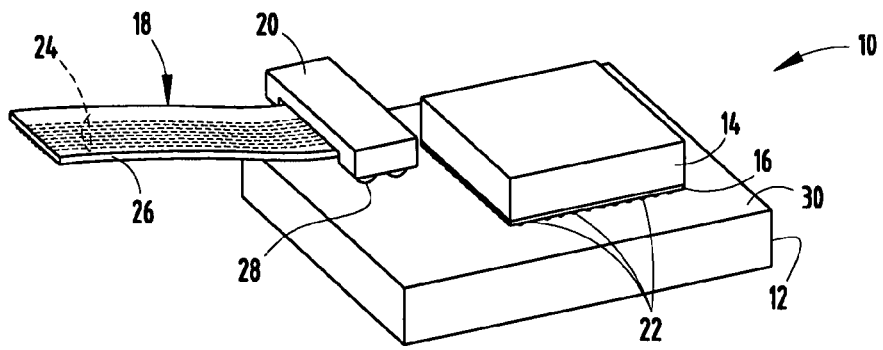
FIG. 1 is an exploded, top perspective view of an optical assembly embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are embodiments of the inventive concepts defined in the appended claims. Hence, specific dimensions and other physical characteristics relating to the embodiments disclosed herein are not to be considered as limiting, unless the claims expressly state otherwise.

The present invention includes micropositioning systems and methods that rely on the formation of one or more microbumps in alignment elements that support optical elements within optical assemblies. In the description below, various methods of forming microbumps in the light-absorbing alignment elements are first described. This is followed by a description of example embodiments of methods for micropositioning an optical element via the formation of one or more microbumps in the light-absorbing alignment element. An example embodiment of an optical assembly formed using the microbump micropositioning methods of the present invention is also described.

PYREX, as referenced herein, is a registered trademark of Corning, Inc., of Corning, N.Y. The term "microbump" is broadly understood to include various shapes such as circular islands, elongated ridges, etc., as formed in an IR-absorbing glass substrate using the methods described below. The term "optical element" is understood to mean any type of optical component, such as an optical fiber, a planar waveguide substrate, a lens, a microlens, a grating, a beamsplitter, etc., that is capable of being micropositioned. Likewise, the term "optical assembly" as used herein includes a system or structure that includes optical elements, whether alone or in combination with other types of elements, such as electrical, electro-optical, electro-mechanical or mechanical elements. The phrase "light-absorbing substrate" is understood to mean a substrate that absorbs light at an absorption wavelength such as at a visible, near-infrared and/or infrared wavelength, wherein local absorption of the light by the substrate at one or more of the absorption wavelengths locally heats the substrate.

Figure 2:
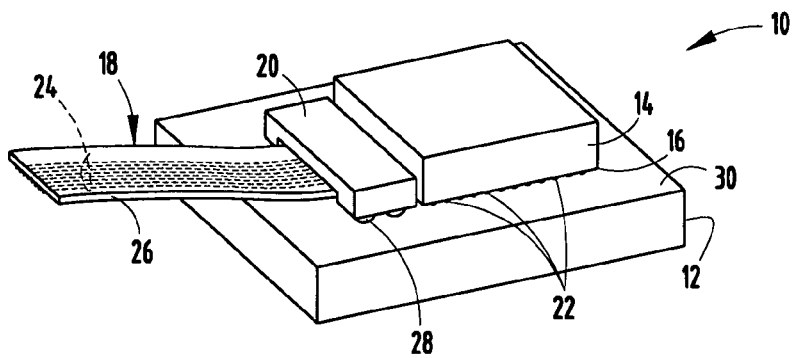
FIG. 2 is a top perspective view of the optical assembly of FIG. 1.
Figure 3:
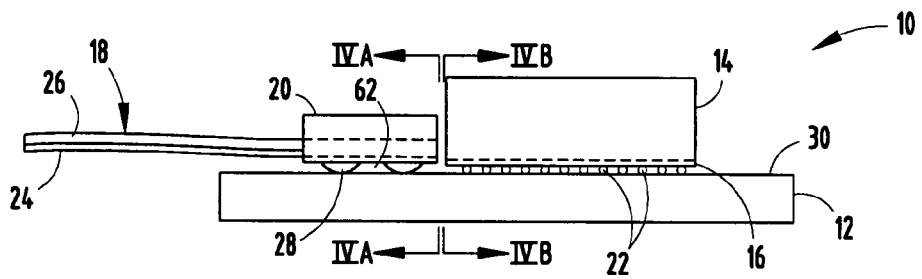
FIG. 3 is a side view of the optical assembly of FIG. 1.
Figure 4A:
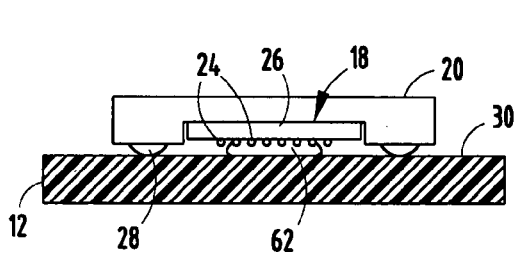
FIG. 4A is a cross-sectional view of the optical assembly taken along line IVa-IVa, FIG. 3.
Figure 4B:
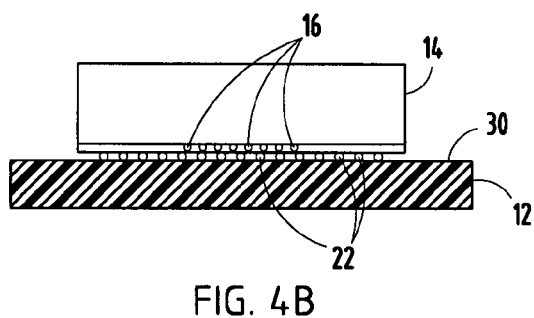
FIG. 4B is a cross-sectional view of the optical assembly taken along the line IVb-IVb, FIG. 3.

The reference numeral 10 (FIGS. 1 and 2) designates an optical assembly embodying the present invention. In the illustrated example, the optical assembly comprises a base substrate 12, an optical substrate 14, an optical waveguide array 16, an optical element 18, and an alignment element 20. The base substrate 12 comprises glass, PCB, a multi-layer ceramic or other materials as known in the art. As illustrated, the optical substrate 14 (FIGS. 3 and 4) supports the plurality of optical waveguides 16, and is supported by a ball grid array 22. It is noted that while a plurality of optical waveguides 16 are shown as supported by the optical substrate 14, other optical and electro-optical elements/devices may also be utilized. Further, although illustrated in an epi-down orientation, an epi-up orientation may be employed.

The optical element 18 (FIGS. 1-4A) is shown in the example as including a plurality of fine-pitch optical waveguides 24 located on optical flex 26. However, other kinds of optical elements and assemblies may be utilized and supported by the alignment element, such as single-mode fiber integrated into a flexible substrate, fine-pitch planar waveguides on a flexible substrate, fiber ribbon arrays, multi-core fibers implemented individually, or integrated into a flexible substrate, and the like.

The alignment element 20 comprises a light-absorbing material, and preferably a IR light-absorbing glass, such as the family of IR-absorbing PYREX glasses available from Corning, Inc. In the present example, the alignment element 20 includes certain IR-absorbing species such as metal dopants, e.g. Cu, Fe, Co and/or V, that cause the glass to experience a dramatic and local reduction in density when heated rapidly at a given location, resulting in glass expansion.

Figure 5:
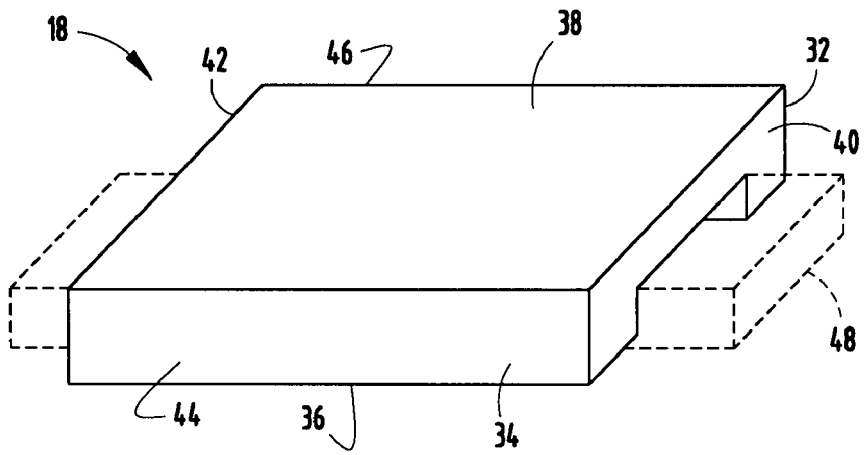
FIG. 5 is a perspective top of a light-absorbing alignment element of the optical assembly ported on a movable support stage shown in dashed in line.

The present inventive process generally includes forming micro alignment bumps 28 on a surface of the alignment element 20 prior to attachment of the alignment element 20 to the base substrate 12. In the illustrated example, the alignment element (FIG. 5) comprises a monolithic light-absorbing glass substrate 32 having a body portion 34, a lower surface 36, an upper surface 38, opposite ends 40, 42, and opposite sides 44, 46. A movable support stage 48 supports substrate 12 and is translatable in the substrate plane. In a preferred embodiment, the alignment element 20 comprises a glass capable of absorbing light or heat energy in a localized region and in response thereto, rapidly expanding or swelling in the localized heated region.

Figure 6:
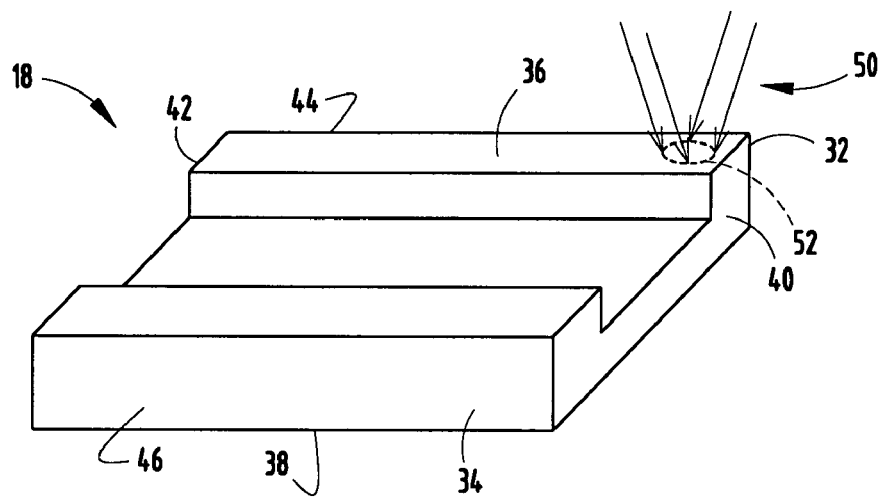
FIG. 6 is a bottom perspective view of the alignment element being irradiated with radiation beam.

The method of forming microbumps in alignment element 20 (FIG. 6) includes locally heating the alignment element 20. In the present example, this involves directing a light beam 50 to a localized region of alignment element 18 as defined by a beam spot 52 formed by the light beam on the lower surface 36 of the alignment element 18. The alignment element 18 is irradiated so as to locally heat the substrate. In an example embodiment, the light beam 50 is convergent.

The position of beam spot 52 on lower surface 36 is selectable by moving support stage 48 or by adjusting the position of light beam 50. In the present example, a laser generating a light beam 50 having an IR wavelength is utilized, such as a $CO_2$ laser that emits radiation (e.g., at 10.6 μm). Alternatively, light beams in the near infra-red wavelength (810 nm) may be utilized, so that the relatively long Rayleigh range of a laser-generated light beam 50 ensures that even minor variations in beam focus do not strongly influence the size of beam spot 52 during stage translation. In another alternative embodiment, the light beam 50 includes at least one of a visible wavelength, an NIR wavelength and an IR wavelength. In an example embodiment, visible wavelengths range from ~400 nm to ~750 nm, NIR wavelengths range from ~750 nm to ~1100 nm, and IR wavelengths include wavelengths in the range from ~1100 nm to ~1680 nm.

The absorption of light by alignment element 18 from light beam 50 locally heats the alignment element 18 and initially raises the temperature of the portion of the body portion 34 in proportion to intensity of the light beam 50. If the light beam 50 has a circularly symmetric cross-sectional intensity distribution, such as a Gaussian distribution, then the beam spot 52 is circularly and the substrate expansion occurs over a circular region as well.

Figure 7:
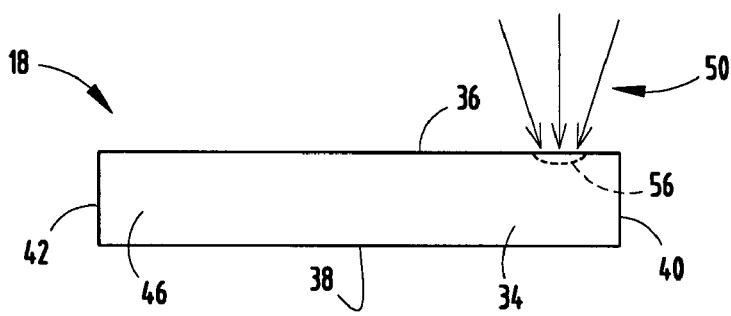
FIG. 7 is a side elevational view of the alignment element.

When light beam 50 (FIG. 7) is locally absorbed by body portion 34, a limited expansion zone 56 is created within which the rapid temperature change induces a dramatic decrease in density of the alignment element 20. Thus, an example embodiment of the method includes modifying the depth of the expansion zone 56 by adjusting the intensity of the light beam 50, the size of the beam spot 52 and/or the irradiation duration. In an example embodiment, the depth of the expansion zone 56 is changed or made selectable by adjusting the concentration of the IR-absorbing materials in the substrate, as described above.

Since the expansion zone 56 is constrained by unheated (and therefore unexpanded) regions of body portion 34 surrounding the expansion zone 56, the substrate material within the expansion zone is compelled to relieve internal stresses by deforming upward, thereby forming a microbump 28. In the illustrated example, the surface profile of microbump 28 corresponds to the light beam intensity distribution, with the microbump peak corresponding to the location of the highest beam intensity. The light beam 50 may be scanned over any surface of the alignment element 18 and stopping at specific locations so as to form microbumps 28 of various shapes and sizes. Bump profiles of various sizes and shapes can also be formed by adjusting the light beam power, sweep velocity and path during the course of the bump forming process for a single bump.

The method of forming microbump 28 further includes fixing the microbump by rapidly cooling the heated region of the substrate. In an example embodiment, this is accomplished by terminating the irradiation of lower surface 36 of the alignment element 18 by the IR radiation beam 50.

The location and height of the alignment bumps 28 are based a precision characterization of a locating surface 30 of the base substrate 12, and the relative alignment and location of the optical waveguides 24, the optical flex 26 and the alignment element 20 with respect to one another. This characterization accommodates typically variations in optical substrate waveguide array position above the base substrate 12 due to the surface mount process. A separate characterization process is performed to determine the position of the flex substrate waveguide arrays relative to the polished bottom surface 36 of the alignment element 18. The relative positions of the optical substrate or flex waveguide positions can be determined using one or more methods, including: scanning laser profilometry, wherein offsets of misaligned components can be characterized to less than 0.2 microns; image analysis of single-image or stereoscopic views of coupling region waveguides and features; white light interferometric techniques; active measurement of optical power coupled between the optical substrate waveguide and a separate movable waveguide held in a precision motions system fixture; probing methods that establish component offsets by detecting physical contact; and, combinations of these methods, such as waveguide location determination by measuring the amount of light blacked by a moving probe as it sweeps in from of a waveguide, and transversing a probe mounted on a precision stage though a coupling region and imaging the transversal to provide multiple calibration points in the waveguide coupling region.

The characterization process may be carried out on a set of the individual alignment elements 20 and/or the optical substrates 14 with integrated bottom side alignment bumps prior to mounting on the base substrate. Using this process, the alignment bump heights are set so that the height of the waveguide centers above the base substrate 12 is set to some standardized value, thereby allowing the alignment elements 20 and/or the optical substrates 14 to be mixed and matched as needed at assembly time providing a flexible platform for assembly of complex optical components. Alternatively, one or more of the optical substrates 14 may be attached to the base substrate 12 prior to bump formation on the alignment element 20. In this case, the height of the waveguide centers above the base substrate 12 may not equal a standardized distance. As a result, the alignment bumps are formed on the alignment element 20 such that the height of the waveguide centers thereof matches the height of the waveguide centers on the optical substrate 14. In this manner, the alignment bumps may be formed solely on measurements on the pre-mounted optical substrate 14. Alternatively, the alignment element 20 may be positioned in close proximity to the optical substrate 14 such that any misalignment can be measured via the characterization means described above. Further, it may be desirable to preform small alignment bumps on the bottom of the alignment element 20 prior to this characterization step. These preformed alignment bumps serve as stand-offs to ensure that any particulate debris present between the alignment element 20 and the base substrate 12 does not introduce an offset error in estimates of the alignment element 20 required bump heights. The heights of the alignment bumps are characterized prior to characterization of the alignment element 20 in proximity to the optical substrate 14 such that the alignment bump height may be added to required bump height estimates to achieve correct waveguide alignment.

Subsequent to formation of the alignment bumps 28, the alignment element 20 is lowered onto the surface 30 of the base substrate 12 until the alignment bumps 28 of the alignment element 20 are each in contact with the base substrate 12. Additional alignment bumps (not shown) located on the side or front face of the alignment element 20 may be provided for additional lateral and axial flex waveguide-to-chip waveguide alignment. These alignment bumps would contact walls that are integrated into the base substrate or provided by other structures that are positioned on the base substrate 12. Once the alignment block 20 with the optical element 18 is aligned to the optical substrate 14, the alignment element 20 is attached to the base substrate 12 using a thin layer of low-shrinking UV curable and/or thermal cure adhesive 62. In particular, it is desirable to minimize errors in alignment element height by positioning the adhesive in regions where the alignment bumps are not located, or by using an adhesive of sufficiently low viscosity so that it is effectively removed from any bump/element contact locations when sufficient download pressure is applied on the alignment element 20.

Once the locations of all waveguides and reference surfaces are determined, the height of microbumps 28 formed on the bottom surface 36 of the alignment element 20 that will bring the optical element 18 and optical substrate waveguides 16 into alignment may be calculated. In the present example, the microbumps 28 are formed prior to alignment and attachment of the alignment element 20 on the base substrate 12.

It is noted that a detailed description of the methods and apparatus relating to and incorporating the formation alignment microbumps within optical and electro-optical devices are set forth in U.S. Patent Publication No. US 2007/0201797 published Aug. 30, 2007, and entitled GLASS-BASED MICROPOSITION SYSTEMS AND METHODS which is hereby incorporated by reference herein in its entirety.

In an alternative approach, microbumps 28 formed on the alignment element 20 in-situ, using active optical feedback and/or any of the component location characterization methods described above. In this case, microbumps formed via top side or bottom side illumination, depending on the transparency of the base substrate 12. In-situ alignment may also be performed using thin glass microactuation using organic adhesives 36 or non-optical bump forming methods, such as electrode-formed bumps. Further, while FIGS. 1-4 depict microbumps 28 formed on the bottom surface 36 of the alignment element 20, other methods for introducing the precision mechanical displacement for chip-to-flex optical interconnection alignment may also be employed. For example, if the alignment element 20 is thin relative to the target microbump height, bump formation on the top side 28 of the alignment element 20 using laser or electrode IR illumination may introduce small alignment microbumps on the bottom surface 36.

In an alternative approach, the alignment element 20a can be constructed by stacking an IR-transparent substrate material 66 such as 1737 glass or a Si wafer, on top of a two smaller IR-absorbing glass supports 68. It is noted that similar elements appearing in FIGS. 1-4 and FIG. 7 utilized similar reference numerals except for the suffix "a" in the numerals of the latter. The supports 68 are bonded to the IR-transparent substrate material 66 around at least part of the perimeter of the interface region between the supports 68 and substrate 66 using a low-modulus adhesive 70. A microbump 28a forms on a top surface 72 of the supports 68 when the top of the alignment element 20a is illuminated from the top with IR radiation. The microbump 28a pushes the substrate 66 away from the supports 68. By using three laser-formed alignment bumps 28a it is possible to achieve any required chip-to-flex waveguide tip/tilt-z-offset alignment.

Figure 8:
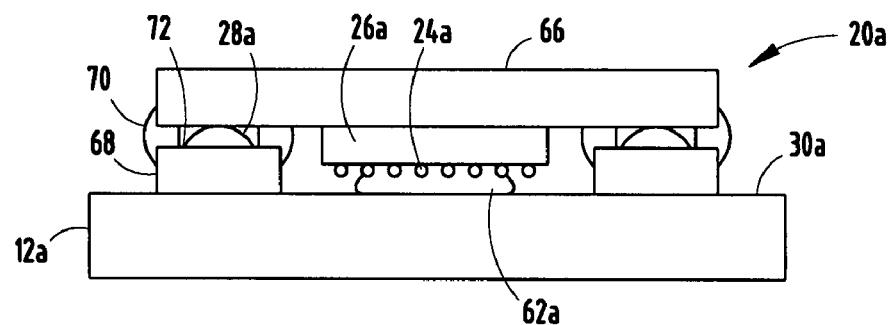
FIG. 8 is an end elevational view of an alternative embodiment optical assembly embodying the present invention.
Figure 9:
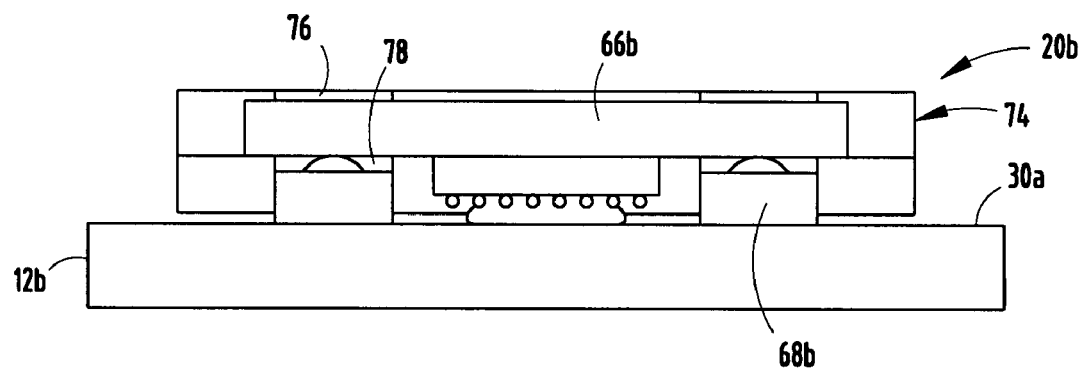
FIG. 9 is an end elevational view of another alternative embodiment optical assembly embodying the present invention.

In another embodiment, the alignment element 20b (FIG. 9) comprises a plurality of laminated layers with the IR-transparent and/or IR-absorbing materials described above being encapsulated between layers. Specifically, the alignment element 20b includes the IR-transparent substrate material 66b atop the two IR-absorbing glass supports 68b, wherein the substrate 66b is laminated between a flex substrate 74 having upwardly-disposed windows 76 and downwardly-disposed channels 78 within which the supports 68b are positioned. Similar elements appearing in FIG. 8 and FIG. 9 utilize similar reference numerals except for the suffix "b" in the numerals of the latter. The windows 76 and channel 78 within the substrate 74 allow: IR laser radiation to pass through the substrate 74 without attenuation; laser bump penetration through the substrate 74 without mechanical interference; and, thermal isolation of the substrate 74 from the laser-heated supports 68a during formation of the microbumps 68a.

The present inventive method for forming a microbump for micropositioning an optical element and the resultant optical assembly are compatible with existing surface mount technology processes for mounting electronic components, allow implementation of high-density interconnection technology, are relatively low cost, and provide long term reliability. Further, the present advantages may be implemented in a wide variety of component types and configurations, provide flexibility in the associated manufacturing process, allow standardization of optical interconnection technology and are particularly well adapted for the proposed use.

In the foregoing description, it will be readily appreciated by those skilled in the art, that modifications may be made to the invention without departing from the concepts as disclosed herein, such modifications are to be considered as included in the following claims, unless these claims by their language expressly state otherwise.

What is claimed is:

1. A method of forming a microbump for micropositioning an optical element, comprising:
    providing a base substrate;
    providing a first optical element to be supported by the base substrate;
    providing an alignment element capable of locally expanding when locally heated and adapted to support the first optical element from the base substrate;
    locally heating the alignment element to cause local expansion of the alignment element so as to create a microbump on alignment element;
    terminating heating of the alignment element so as to fix the microbump; and
    securing the alignment element to the base substrate, thereby supporting the first optical element from the base substrate.

2. The method of claim 1, wherein the step of locally heating the alignment element comprises creating the microbump on a surface of the alignment element located between the alignment element and an upper surface of the base substrate.

3. The method of claim 1, further comprising:
    providing a second optical element secured to the base substrate; and
    wherein the step of locally heating the alignment element to create the microbump optically aligns the first optical element with the second optical element.

4. The method of claim 3, wherein the step of locally heating the alignment element vertically aligns the first optical element with the second optical element.

5. The method of claim 1, wherein the step of providing the first optical element includes providing the optical element as comprising at least a select one of a planar waveguide and an optical fiber.

6. The method of claim 1, wherein the step of providing the alignment element includes providing the alignment element as comprising a light-absorbing medium, and wherein the step of locally heating the alignment element includes locally irradiating the alignment element with a light beam.

7. The method of claim 6, wherein the step of locally heating the alignment element to create the microbump includes irradiating the alignment element through the base substrate.

8. The method of claim 6, wherein step of step of locally heating the alignment element includes providing the light beam at least a select one of a visible wavelength, a near-infrared wavelength and an infrared wavelength.

9. The method of claim 1, wherein the steps of locally heating the alignment element and terminating heating of the alignment element are completed prior to the step of securing the alignment element to the base substrate.

10. The method of claim 1, wherein the step of providing the alignment element includes providing the alignment element as monolithic and doped with at least one light-absorbing species.

* * * * *